United States Patent Office 2,815,332
Patented Dec. 3, 1957

2,815,332

CATALYST FOR THE PRODUCTION OF GLYCOL AND POLYGLYCOL ETHERS OF ISOCYCLIC HYDROXYL COMPOUNDS

Frederick Grosser, North Plainfield, N. J., assignor to General Aniline & Film Corporation, New York, N. Y., a corporation of Delaware No Drawing. Application July 22, 1954, Serial No. 445,194

6 Claims. (Cl. 252—430)

This invention relates to an improved catalyst for use in the continuous process of preparing glycol and polyglycol ethers of isocyclic hydroxyl compounds.

It is known that alkylene oxides react readily with hydroxyl containing compounds under the influence of alkaline catalysts to yield glycol and polyglycol ethers useful commercially as wetting, softening, emulsifying, dispersing, washing and cleansing agents. The products obtained by the condensation of alkylene oxides with substituted isocyclic hydroxyl compounds as disclosed in U. S. P. (2,213,477) are by far the most desirable because of their unusual high capillary active properties. For best results and high yields potassium or sodium hydroxide based on the substituted isocyclic hydroxyl compounds is used to catalyze the reaction, and this potassium or sodium hydroxide must be dissolved uniformly in the hydroxyl compound. Inasmuch as potassium or sodium hydroxide dissolves very slowly in substituted isocyclic hydroxyl compounds at room temperature, and even at elevated temperature, such as for example, 75° C., a period of time ranging from 1 to 2 hours with constant agitation is required to effect solution. The principal disadvantage of this procedure is that the substituted isocyclic hydroxyl compound darkens considerably in the presence of potassium or sodium hydroxide and the darkening becomes considerably accelerated and intensive as the temperature increases. This darkening is highly undesirable since it results in a darker colored end product which for commercial applications should be as nearly colorless as possible.

In the batch-wise condensation reaction of substituted isocyclic hydroxyl compounds with alkylene oxide, the potassium or sodium hydroxide is first dissolved in the substituted isocyclic hydroxyl compound, the solution is subjected to heat and reduced pressure in order to remove water, and then the alkylene oxide is added. The water must be removed since its presence would permit the undesired side reaction of polyethylene oxide formation to occur. In the so-called continuous condensation reaction of substituted isocyclic hydroxyl compounds with alkylene oxide, the process is really only semi-continuous since although the solution of potassium or sodium hydroxide in the hydroxyl compound is reacted continuously with alkylene oxide, by mixing the two in a long tube, the solution of potassium or sodium hydroxide in the hydroxyl compound is still made batch-wise. Accordingly, therefore, it is highly desirable to effect this solution in a continuous manner in order to make the entire process a continuous one.

The continuous addition of solid potassium or sodium hydroxide to substituted isocyclic hydroxyl compounds presents serious mechanical difficulties, and the rate of solution is so slow as to make it doubtful that a uniform solution could be effected in this manner. The continuous addition of aqueous potassium or sodium hydroxide to the hydroxyl compound is likewise impractical since the aqueous potassium or sodium hydroxide is insoluble in the hydroxyl compound. The potassium or sodium hydroxide is immediately precipitated from solution when its aqueous solution contacts the hydroxyl compound.

In order to offset these shortcomings, it has been proposed to utilize methanol solutions of potassium or sodium hydroxide, i. e. potassium or sodium alcoholates. Although methanol solutions of potassium or sodium hydroxide are readily soluble in substituted isocyclic hydroxyl compounds, the solubility of the potassium or sodium hydroxide in methanol, however, is so limited as to make this an unattractive solution to the problem. A relatively large amount of methanol is required to solubilize the desired amount of potassium or sodium hydroxide, and this methanol must be removed from the solution before it is reacted with the alkylene oxide.

To provide a process which would effect solution of the potassium or sodium hydroxide rapidly and at a low temperature in order to minimize the development of the dark color in the substituted isocyclic hydroxyl compound, constitutes the principal object of the present invention.

Other objects and advantages will appear from the following specification:

I have found that when 1 to 10 parts by weight of a lower alkyl alcohol containing from 1 to 3 carbon atoms such as, methanol, ethanol, propanol, and isopropanol is added to 10 parts by weight of a 50% aqueous potassium or sodium hydroxide solution, the resulting solution is rendered readily soluble in substituted isocyclic hydroxyl compounds. This provides a solution which has both a high potassium or sodium hydroxide content ranging from 25 to 46% and ready solubility in the substituted isocyclic hydroxyl compounds. By the use of such a solution a convenient method is afforded for the continuous preparation of a solution of potassium or sodium hydroxide in substituted isocyclic hydroxyl compounds. The amount of lower alcohol and water thus introduced into the substituted isocyclic hydroxyl compound, which must be subsequently removed, amounts to less than 0.5% and is readily and conveniently removed along with the small amounts of water normally present in the substituted isocyclic hydroxyl compound, and including that which is formed by the reaction of the potassium or sodium hydroxide with the hydroxyl compound. The amount of lower alcohol employed is so small that it need not be recovered.

Another advantage from the manufacturing point of view is that the removal of water and lower alcohol from the solution lends itself readily to a continuous operation which is highly preferred to the batch-wise operation, since the substituted isocyclic hydroxyl compound is subjected to heat for a much shorter period of time.

In preparing the caustic catalyst a stream of approximately 100 parts of liquefied substituted isocyclic hydroxyl compound is merged with a stream of approximately 0.5 to 2 parts by weight of a solution consisting of 25 to 50 parts by weight of potassium or sodium hydroxide, 5 to 50 parts by weight of a lower alkyl alcohol of from 1 to 3 carbon atoms, and 25 to 50 parts of water, and then fed into a vertical, heated column, packed with Raschig rings, and fitted with a receiver at its base. As the solution flows down the vertical column by gravity, the column is maintained under a pressure of 5 to 300 mm. of mercury and at a temperature ranging from 50 to 115° C. The residence time of the solution in the column will depend on the height and diameter of the column as well as the type and amount of packing employed. These factors are readily determined by single routine trials and selected so that the residence time is the minimum period required to remove the water and alcohol from the solution, since solution is effected almost instantaneously as the streams merge. The time required for removal of the water and alcohol is dependent on the temperature and pressure at which the column is operated. Therefore optimum results are obtained at low pressures, i. e. 5 mm., and relatively high temperatures, i. e. 100° C., but even at 300 mm. and 50° C., the time required to effect solution and to remove the solvents is much shorter than in the batch operation, with its attendant advantage of much less color in the product. When employing a glass column having a height of 24 inches and a diameter of one inch, packed with 5/16" glass Raschig rings, the residence time of the solution in the column was 1 to 2 minutes and the through-put rate was 2 to 2.5 pounds per hour. In a stainless steel column having a height of 10 feet and a diameter of 4 inches, packed with 1/2" glass Raschig rings, the residence time of the solution was 7 to 8 minutes and the through-put rate was 28 pounds per hour. However, much higher through-put rates can be easily achieved if desired by trial experiments. The solution of potassium or sodium hydroxide in the substituted isocyclic hydroxyl compound, from which the water and lower alcohol have been flashed off overhead, is collected in a receiver at the base of the column. The column, packing, and receiver may be of any standard construction materials such as glass, steel, cast iron, stainless steel, ceramic material, etc.

As examples of substituted isocyclic hydroxyl compounds which may be employed in accordance with the present invention all of those disclosed U. S. P. 2,213,477 may be employed. All of such compounds disclosed and suggested therein are incorporated herein by reference.

It is to be observed that I prefer to employ those substituted isocyclic hydroxyl compounds which are liquid at ordinary temperatures. I may also employ those which are solids or semi-solids at room temperatures. In such case, the substituted isocyclic hydroxyl compound may be heated to effect liquefaction, or may be dissolved in a sufficient amount of an aliphatic or aromatic hydrocarbon to effect complete solution. All of the substituted isocyclic hydroxyl compounds disclosed in said patent are soluble in pentane, heptane, hexane, octane and alkyl substituted derivatives thereof; benzene, toluene, cyclohexane, and the like. When such solvents are employed they are flashed off overhead with the water and lower alkyl alcohol.

The alkylene oxides capable of reacting with the solution of substituted isocyclic hydroxyl compounds include ethylene oxide, propylene oxide, butylene oxide, butylene dioxide, cyclohexane oxide, glycidol, epichlorohydrin, butadiene monoxide, isobutylene oxide, styrene oxide and the like.

The following examples are illustrative of the manner in which the catalyst solution is prepared. It is to be understood, however, that they are merely illustrative and are not to be construed as being limitative. All the parts given are by weight.

Example I

Into an electrically heated vertical glass column, 24 inches high and one inch in diameter, packed with 5/16" glass Raschig rings, a stream of 100 parts of nonylphenol was merged with one part of a stream consisting of a solution made up of 30 parts of potassium hydroxide, 30 parts of water, and 40 parts of methanol. The two merged streams were fed to the top of the glass column and allowed to flow down by gravity. The column was maintained under a pressure of about 10 mm. of mercury and at a temperature ranging between 85–100° C. for 1 hour. The water and methanol were flashed off overhead, and the solution of potassium hydroxide and nonylphenol was collected in a flask at the base of the column. Analysis of the resulting solution showed 0.29% potassium hydroxide and 0.18% of water. The theoretical amount of potassium hydroxide added was 0.30%.

Example II

Example I was repeated with the exception that the nonylphenol was replaced by isododecylphenol and 1000 parts of the isododecylphenol was merged with 6 parts of the caustic potash solution which was made up as follows: 30 parts potassium hydroxide, 30 parts of water, and 30 parts of methanol. Analysis of the resulting solution showed 0.19% of potassium hydroxide and 0.14% of water. The theoretical amount of potassium hydroxide added was 0.20%.

Example III

Example I was repeated with the exception that isooctylphenol was used in place of nonylphenol and it was heated to about 80° C. in order to maintain it in a liquid state. Analysis of the resulting solution showed 0.31% potassium hydroxide and 0.08% water. The theoretical amount of potassium hydroxide added was 0.30%.

Example IV

Into a jacketed stainless steel column, 10 feet high and four inches in diameter, packed with 1/2" glass Raschig rings, and heated with steam, a stream of 1000 parts diisobutylphenol was merged with 8 parts of a stream consisting of a solution made up of 50 parts sodium hydroxide, 50 parts water, and 55 parts methanol. The two merged streams were fed to the top of the column and allowed to flow down by gravity. The column was maintained under a pressure of 5–10 mm. mercury and at a temperature ranging between 90–110° C. for 50 minutes. The water and methanol were flashed off overhead, and the solution of sodium hydroxide in diisobutylphenol was collected in a flask at the base of the column. Analysis of the resulting solution showed 0.28% sodium hydroxide and 0.09% water. The theoretical amount of sodium hydroxide added was 0.26%.

Example V

Example IV was repeated with the exception that diisobutylphenol was replaced with isoamylcresol, and 100 parts isoamylcresol was merged with 1 part of a caustic solution made up as follows: 30 parts sodium hydroxide, 30 parts water, and 40 parts isopropanol. Analysis of the resulting solution showed 0.28% sodium hydroxide and 0.12% water. The theoretical amount of sodium hydroxide added was 0.30%.

From the foregoing examples, it becomes clearly manifest of the practicability of the invention and the several advantages flowing therefrom which are as follows:

(1) A continuous method is provided for the preparation of a solution of potassium or sodium hydroxide in a substituted isocyclic hydroxyl compound which makes possible a completely continuous process for the preparation of surface active agents as opposed to the present semi-continuous process.

(2) The solution of the potassium or sodium hydroxide in the substituted isocyclic hydroxyl compound is effected practically instantaneously without heat, thus minimizing the development of color in said hydroxyl compound, and resulting ultimately in a lighter colored final product.

(3) The continuous dehydration of the catalyst solution in a heated, evacuated tower is much more effective and faster than the present batch-wise method.

(4) Inasmuch as the time of heating during dehydration is much shorter in the continuous than the batch-wise method, development of color in the substituted isocyclic hydroxyl compound is minimized, thus resulting again in a lighter colored final product.

It is to be noted that the process of the present invention can be applied to all condensation reactions of alkylene oxides, with other reactive intermediates, or coreactants wherein potassium or sodium hydroxide is used as a catalyst.

It is to be clearly understood that by the term "organic solvent" as employed in the appended claims, I only intend to include the lower alkyl alcohols of 1 to 3 carbon atoms and the aliphatic and aromatic hydrocarbons disclosed herein and employed as solvents for the substituted isocyclic hydroxyl compounds.

I claim:

1. The process of preparing an alkali metal hydroxide solution as catalyst for the condensation of a substituted isocyclic hydroxyl compound with an alkylene oxide which comprises merging a stream of approximately 100 parts of a substituted isocyclic compound in fluid form having the general formula $$R\text{---}OH$$

wherein R represents a phenyl ring substituted at least once by a member of the group consisting of alkyl radicals and acyl radicals, said alkyl and acyl radicals containing from 4 to 18 carbon atoms with a stream of approximately 0.5 to 2 parts of a solution consisting of 25 to 50 parts of an alkali metal hydroxide selected from the class consisting of potassium and sodium hydroxides, 5 to 50 parts of a lower alkyl alcohol having from 1 to 3 carbon atoms, and 25 to 50 parts of water, into a vertical column fitted with a receiver at its base, maintaining said column at a temperature of from 50 to 115° C. and at a pressure of 5 to 300 mm. of mercury for a period of time sufficient to effectuate a solution of the said alkali metal hydroxide in said hydroxyl compound, flashing off the water and organic solvent overhead from said column and collecting the resulting solution in said receiver.

2. The process according to claim 1, wherein the substituted isocyclic hydroxyl compound is nonylphenol.

3. The process according to claim 1, wherein the substituted isocyclic hydroxyl compound is isododecyl phenol.

4. The process according to claim 1, wherein the substituted isocyclic hydroxyl compound is isooctylphenol.

5. The process according to claim 1, wherein the substituted isocyclic hydroxyl compound is diisobutylphenol.

6. The process according to claim 1, wherein the substituted isocyclic hydroxyl compound is isoamylcresol.

References Cited in the file of this patent

UNITED STATES PATENTS

| | | |
|---|---|---|
| 2,213,477 | Steindorff et al. | Sept. 3, 1940 |
| 2,454,541 | Bock et al. | Nov. 23, 1948 |